PHONE ATTACHED RADIO SILENCING DEVICE

Filed Nov. 24, 1947

INVENTOR.
Clarence E. Van Velsor
BY Victor J. Evans & Co.
ATTORNEYS

Patented Feb. 21, 1950 2,498,349

UNITED STATES PATENT OFFICE 2,498,349

PHONE ATTACHED RADIO SILENCING DEVICE

Clarence E. Van Velsor, Berkeley, Calif.

Application November 24, 1947, Serial No. 787,776

1 Claim. (Cl. 179—2)

This invention relates to a device which, when controlled from a telephone, will silence a radio during a telephone conversation.

An object of the invention is to provide a control device which, operated by a switch attached to a telephone, will silence the radio during a telephone conversation.

It often happens that, during a radio program, the telephone will ring, causing the person to either turn off the radio or attempt to listen to the phone conversation while the program is in progress.

This invention, therefore, was designed to permit the radio to be disconnected, so that the telephone conversation is not interrupted by the radio program.

With the above and other objects and advantages in view, the invention consists of the novel details of construction, arrangement and combination of parts more fully hereinafter described, claimed and illustrated in the accompanying drawing in which:

Figure 1:
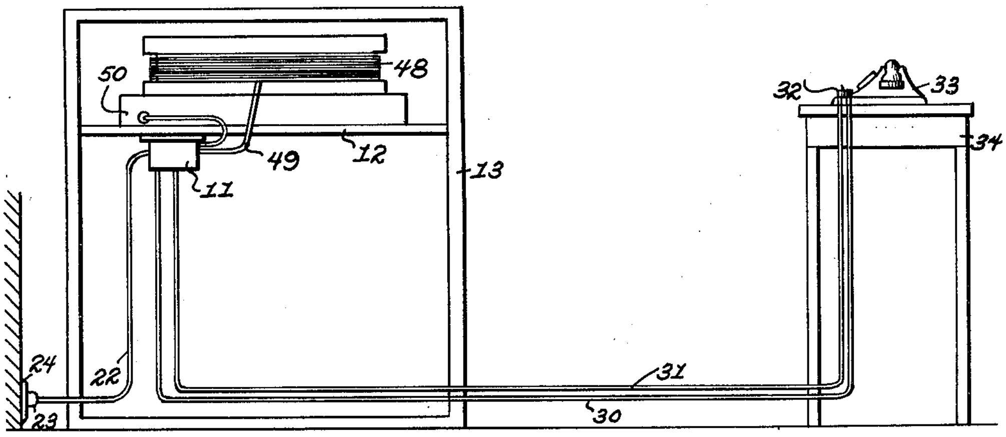
Figure 1 is an elevational view of an embodiment of the invention, as connected to a radio and telephone.
Figure 2:
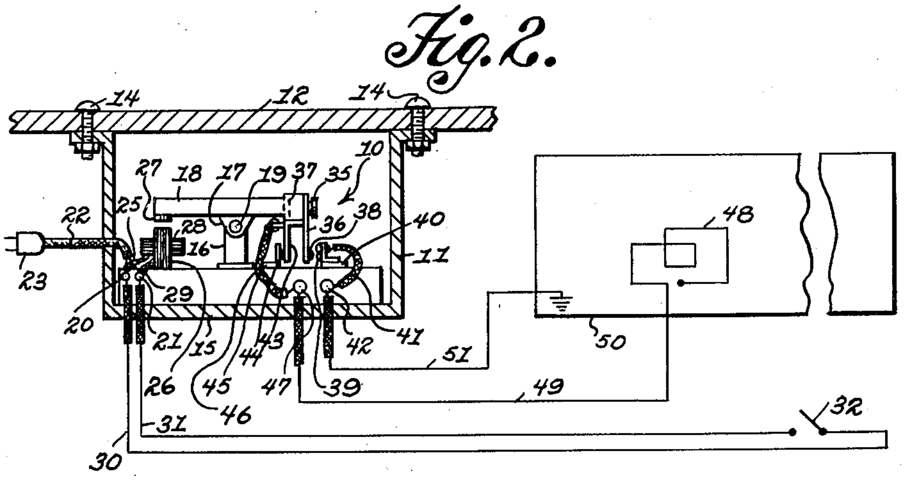
Figure 2 is a sectional and diagrammatic view of the hook-up of the device.
Figure 3:
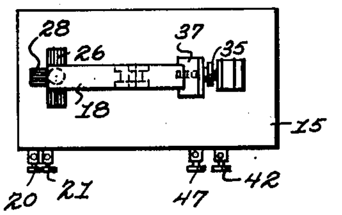
Figure 3 is a top plan view of the device removed from the radio.
Figure 4:
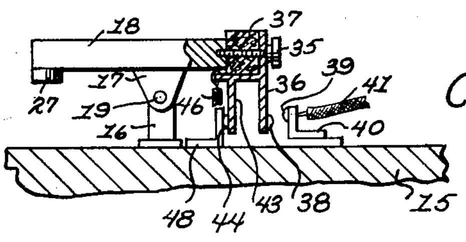
Figure 4 is a detailed sectional view of the magnetic arm of the device.

Referring more in detail to the drawing, the invention is seen to comprise a magnetic switch 10, enclosed in a box-like housing 11, that is secured to the base partition 12 of a radio 13 by fasteners 14.

The switch 10 comprises a base 15, on which is mounted an upright 16 which is pivotally connected to the apertured ears 17 of the magnetic arm 18 by a pin 19.

The base is provided with a pair of terminals 20 and 21 respectively, which are connected to the 110 volt power line 22 having the conventional plug 23 thereon to be inserted in the wall outlet plate 24.

A lead 25 from terminal 20 is connected to the magnetic core 26 mounted on the base 15. The core 26 is adapted to attract the contact face 27 on the outer end of the arm 18. Sleeved on the core 26 is the magnetic coil 28 which is connected by the lead 29 to the terminal 21.

Leads 30 and 31 are connected to the terminals 20 and 21 respectively, and these leads are then connected to the single throw switch 32 mounted on the phone 33, which, as shown, is placed on the table 34.

Secured to the end of the arm 18, by a bolt 35, is a depending arm 36 which is insulated from the arm 18 by a block of insulated material 37. Thus current will not pass from the contact face 27 through the arm 18 to the arm 36. The arm, on its lower end, is provided with a contact face 38, which will engage the contact face 39 on the bracket 40 secured to the base 15. The face 39 is connected by a lead 41 to the terminal 42 on the base 15. Formed integral with the arm 36, below the block 37, is the L-shaped arm 43, having the contact face 44 which engages the stop bracket 45 secured to the base 15 in opposed relation to the bracket 40. The arm 43 is connected by a lead 46 to the terminal 47 on the base 15 in parallel opposed relation to the terminal 42. Terminal 47 is connected to the antenna loop 48 of the radio, by the lead 49, and terminal 42 is grounded to the radio chassis 50 by the lead 51.

In operation, the switch 32 is operated to energize the core and coil 26 and 28 which together form a magnetic switch. The arm 18 will be drawn downward, causing the contact faces 38 and 39 to engage. Thus the antenna coil will be grounded to the radio chassis, and the radio will cease to operate. The current from the switch will not enter the arm 36 so that no current will enter the leads 49 and 51, causing damage to the radio.

The device thus grounds the antenna coil so that the radio will not operate.

It is believed that from the foregoing description, the method of construction and operation of the device will be apparent to those skilled in the art, and it is to be understood that changes in the minor details of construction and arrangement of parts may be resorted to, provided they fall within the spirit of the invention and the scope of the appended claim.

Having thus described the invention, what is claimed as new and desired to be secured by Letters Patent is:

A radio controlling means for grounding the antenna loop of a radio comprising, a magnetic switch having a base, a pair of terminals on the base, a wire connecting one of said terminals to the ground of a radio, a second wire connecting the other of said terminals to the antenna loop of the radio, a magnetic arm pivotally mounted on said base, a second pair of terminals on said base, wires connecting said second pair of terminals to a household power line, a magnet having a coil and core mounted on said base below one end of said magnetic arm, a wire connecting the coil of said magnet to one of said second pair of terminals, a wire connecting the core of said magnet to the other end of said pair of terminals, a contact and a stop bracket mounted on said base in opposed relation to each other, a wire connecting said contact to the terminal connected to the ground of the radio, an insulated depending arm on the magnetic arm on the end opposite to the end above the magnet and said arm disposed intermediate of said contact and said stop bracket, contact faces on said arm, a wire connecting one of said contact faces to the terminal connected to the antenna loop of the radio, a pair of wires connected to the terminals connected to the household power line, a switch interpolated in the wires connecting the second terminal to the household power line and the closing of said switch adapted to connect the household power line to the magnet to energise said magnet to attract that end of the bar above said magnetic arm and cause said insulated depending arm to move to engage the contact connected to the terminal connected to the ground of the radio to ground the antenna loop of the radio to cut off the radio during the use of the telephone.

CLARENCE E. VAN VELSOR.

REFERENCES CITED

The following references are of record in the file of this patent:

UNITED STATES PATENTS

| Number | Name | Date |
|---|---|---|
| 1,961,131 | Becker | June 5, 1934 |
| 2,165,693 | Bross | July 11, 1939 |